Patented May 20, 1947

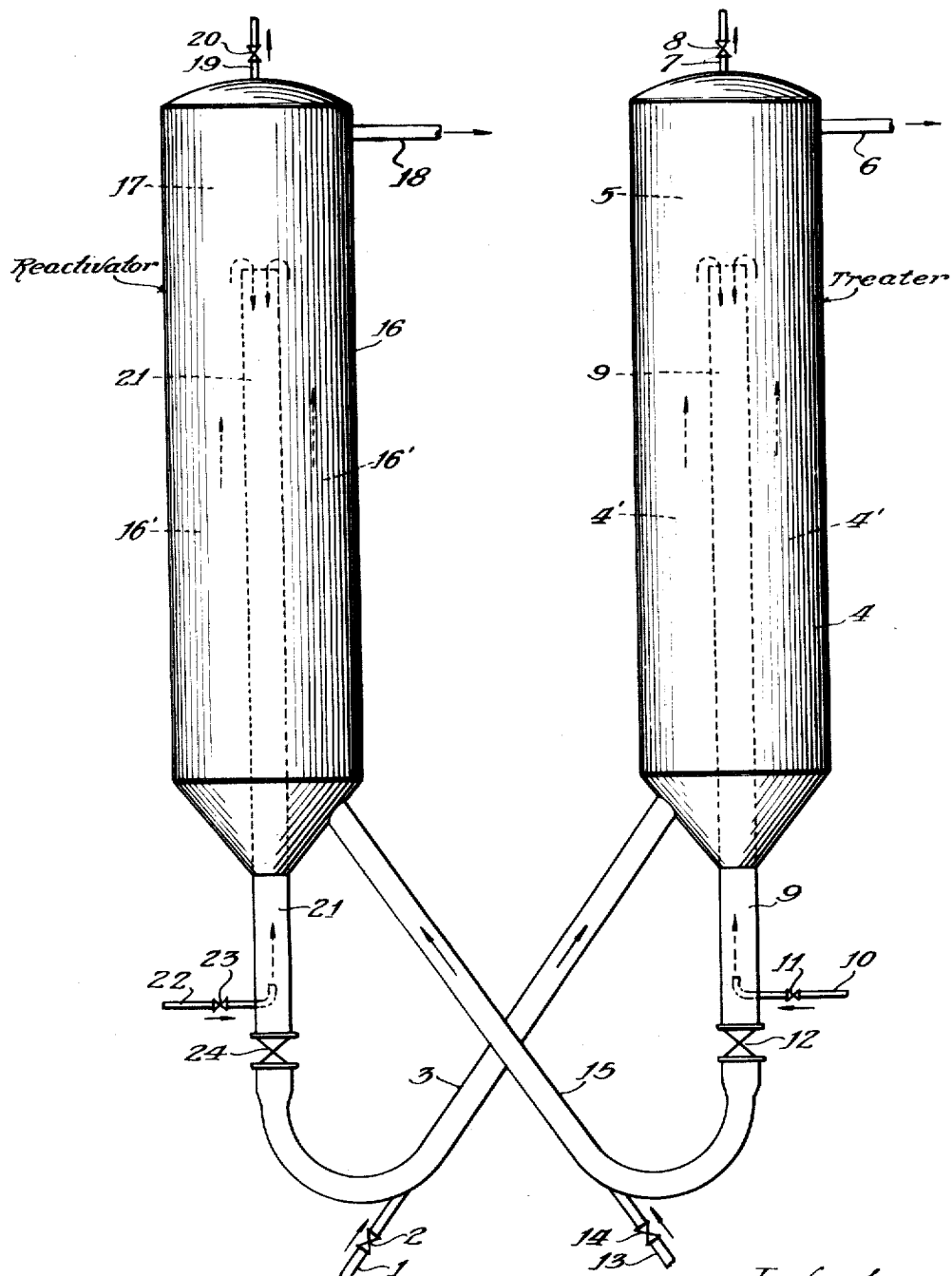

2,420,761

UNITED STATES PATENT OFFICE 2,420,761

PROCESS FOR TREATING A LIQUID WITH A SUSPENSION OF SOLIDS BY PASSAGE THEREOF THROUGH A SEPARATOR, REGENERATING THE SEPARATED SOLIDS FOR RE-USE WITH UNTREATED LIQUID

Charles L. Thomas, Chicago, Ill., assignor to Universal Oil Products Company, Chicago, Ill., a corporation of Delaware Application October 23, 1942, Serial No. 463,054

3 Claims. (Cl. 196—147)

The present invention is concerned with a process for contacting solids with liquids for the production of treated products by exchange reactions, and is characterized by effecting the contacts in moving streams of liquids.

There are many types of industrial processes in which liquids are contacted with granular solids in order to effect a change either in the character of the liquid or the solid. In most of these processes the granular material constitutes a stationary bed through which the liquid to be contacted is passed either in an upward or downward direction to effect various types of exchange reactions. As examples of such solid-liquid contacts may be mentioned the passing of oils, either or an animal, vegetable, or petroleum origin, in contact with granular adsorbents to effect the refining of the oils through the adsorption of undesirable colors, odors and tastes by the adsorptive action of the granular materials. In such cases, the granular materials may include such substances as activated carbons or chars, clays, various types of fuller's earth, and refining agents such as bauxite and specially prepared granular composites of a mixed character. In a similar way sugar solutions may be refined by contact with granular chars. Waters may be treated to render them potable or improve their properties for commercial uses by passing them through beds of zeolites or permutites which have the property of exchanging alkali metals for alkaline earth metals and thus softening and otherwise improving the waters treated.

In stationary bed operations of the character described it is customary to pass a liquid through a stationary bed of granular solid until the treating capacity of the solid is spent, after which the liquid undergoing treatment is diverted through a fresh bed of granular solid and steps are taken for the reactivation of the spent material whenever this is economical. In such alternate bed processes the switching of the flow of the liquid undergoing treatment and the reactivation of the spent solid may involve considerable manipulation of valves, either manually or automatically. It is with an improved method of effecting solid-liquid contacts which permits smoother and more definite operations that the present invention is concerned.

In one specific embodiment the present invention comprises a process for treating liquids with granular solids which comprises passing a suspension of solid in the liquid to be treated upwardly through a treating zone, separating the spent solid from the treated liquid in a zone of increased cross-section and decreased flow rate by gravity, allowing the separated solid to settle countercurrent to an ascending stream of purifying liquid to effect a partial purification thereof, contacting the partially purified solid with further quantities of a wash liquid which carries the solid in suspension upwardly through a zone wherein further reactivation of the solid occurs, separating the solid from the wash liquid by gravity in a second zone of decreased flow rate, allowing the solid to settle countercurrent to further quantities of purifying liquid and returning the purified solid to further contact with the primary liquid to be treated.

The flow which characterizes the present process of solid-liquid contact will be described by reference to the attached drawing which shows in general side elevation an arrangement of apparatus in which the process may be effectively conducted. The drawing is diagrammatic and not drawn to any absolute or relative scale.

A liquid to be contacted with a granular solid is introduced through a line 1 containing a valve 2 and recovered solid material is admitted to the stream of liquid through a valve 24 which may be of any type found effective for separating the purified solid from the liquid used in its purification. The liquid to be treated passing into line 3 is introduced at a velocity sufficient to carry amounts of solid necessary for effecting the treatment of the liquid and in the drawing the dotted arrows indicate a suspension of solid in liquid which rises upwardly through annular space 4' in treater 4. On entering upper section 5 the velocity of liquid flow is reduced owing to the increased cross-section and the spent or partly spent solid treating material settles by gravity into inner cylindrical tube 9, while the treated liquid flows upwardly and is recovered from overflow pipe 6. Line 7 containing a valve 8 is provided for the release of any gas which may accumulate.

The spent solid treating reagent then flows downwardly by gravity countercurrent to an ascending stream of purifying or purging liquid which is introduced through line 10 containing valve 11, the rate of flow of this purifying fluid being kept at a value which permits the settling of the solid. The partly purified solid is then permitted to drop through valve 12 into a further stream of purifying fluid admitted from line 13 containing valve 14 and the solid is then carried through line 15 into annular space 16' in reactivator 16. During passage through the annular space the wash liquid, which may be of the same or different character than that employed in inner tube 9, effects a further purification of the solid and upon entering upper section 17 the liquid velocity decreases, the purifying liquid is recovered from overflow line 18, and the partly purified solid falls by gravity through inner tube 21 against a final stream of purifying liquid introduced through line 22 containing a valve 23 at a rate permitting the settling of the solid. Line 19 containing valve 20 permits the release of any accumulations of fixed gases in section 17 of the reactivator. The purified solid is then permitted to fall through valve 24 and again be picked up by the stream of inlet liquid introduced through line 1 and recycled.

The flow of the character described may be employed advantageously in the treatment of lubricating oils with granular fuller's earth or clay-like materials. Thus, the granular solid is carried up through annular space 4' in treater 4 at some temperature found optimum for effecting decolorizing or other treatment of the lubricating oil, the spent granular solid then overflows into tube 9 and may settle downwardly countercurrent to a wash liquid consisting of a light petroleum naphtha which removes traces of adhering lubricating oil so that the lubricating oil and the naphtha pass out through line 6, the naphtha being removed from the lubricating oil by subsequent distillation. The granular clay-like material then falls into the lower part of tube 9 through valve 12 and may be further extracted with a more powerful solvent such as, for example, a mixture of benzol and alcohol or acetone which extracts adsorbed impurities of a polymerized or asphaltic character coating the solid particles, these impurities not being removed by the naphtha. While flowing through annular space 16', the solvent mixture may effect substantially complete extraction of impurities and in section 17 of the reactivator, the solution containing the extracted impurities is separated from the solid and is removed through line 18 from whence it may be sent to a solvent recovery system. In falling through inner tube 21, the solid treating reagent may flow countercurrent to a final solvent liquid and then pass through valve 24 into a lower section of tube 21 to further treat the lubricating oil introduced through line 1.

The flow shown may also be used for softening waters by the use of base exchange zeolites, in which case a hard water introduced through line 1 will carry the activated zeolite upwardly through line 3 and annular space 4' in treater 4. The softened water and the spent zeolite will separate in section 5 with the water recovered through line 6 and the granular zeolite falling downwardly in tube 9 against a rising stream of softened water. The zeolite passing through valve 12 will then meet a stream of salt solution introduced through line 13 and in passing through line 15 and annular space 16' of reactivator 16, the sodium of the salt solution enters the zeolite and the alkaline earth bases enter the liquid as chlorides. The zeolite and wash liquid are separated in section 17, the wash liquid passing out through line 18 and the zeolite settles by gravity through tube 21 countercurrent to a slowly ascending stream of liquid introduced through line 22 which may be a softened water. The zeolite passing through valve 24 is then in condition to further soften the stream of water introduced by way of line 1.

In an application of the present process flow silica hydrosols may be produced by continuously contacting solutions of alkali metal silicates with hydrogen exchange zeolites which are made by treating ordinary zeolites or special carbonaceous zeolytic materials with mineral acids. In such cases the flow will generally be similar to that just described for softening hard waters with granular zeolites but the liquid recovered from section 5 of the treater will constitute the silica hydrosol, while the zeolite will then contain the alkali metal and be subject to washing in tube 9 and annular space 16' with mineral acids to replace sodium with hydrogen.

In a further modification of the process flow the sodium ions present in silica-alumina type composites made by compositing alumina in various ways with silica produced by the acidification of alkali metal silicate solutions may be treated for the removal of sodium by contacting them with ammonium salt solutions, using the general type of flow already described. After this operation the silica-alumina composites are heated to drive out ammonium salts and then, if otherwise properly prepared, are ready for use in catalysts for hydrocarbon conversion reactions.

I claim as my invention:

1. In the treatment of a liquid with a subdivided solid, the method which comprises introducing a suspension of the solid in the liquid to the lower portion of a first contacting zone and passing the suspension upwardly through said zone, separating solid particles by gravity from the treated liquid in an upper region of said zone, removing the treated liquid from said zone, simultaneously passing a stream of purifying liquid upwardly in a confined path within said zone, passing the separated particles downwardly by gravity through the ascending stream of purifying liquid, thereafter suspending said particles in additional purifying liquid and passing the resultant suspension upwardly through a second zone, separating thus treated solid particles by gravity from said additional liquid in an upper region of the second zone, simultaneously passing a second stream of purifying liquid upwardly in a confined path within said second zone, passing said treated solid particles downwardly by gravity through said second ascending stream of purifying liquid, and then returning the solid particles to the first-mentioned zone in suspension in a further quantity of the liquid to be treated.

2. In the refining of hydrocarbon oil by treatment thereof with particles of solid adsorbent material to remove impurities from the oil, the method which comprises passing a suspension of the solid adsorbent particles in the oil upwardly through a treating zone, separating solid particles containing impurities from the treated oil by gravity in an upper region of said zone, passing the separated particles downwardly by gravity through an ascending stream of wash liquid for adhering hydrocarbons, thereafter suspending the solid particles in a liquid solvent for adsorbed impurities and passing the resultant suspension upwardly through a second zone, separating thus treated particles by gravity from said liquid solvent in an upper region of the second zone and passing the same downwardly by gravity through an ascending stream of additional liquid solvent, and then returning the solid particles to the first-mentioned zone in suspension in a further quantity of the oil to be refined.

3. A process for producing a silica hydrosol which comprises passing a suspension of a hydrogen exchange zeolite in a solution of an alkali metal silicate upwardly through a treating zone wherein said silica sol is produced by exchange of alkali metal for hydrogen, separating the zeolite from the silica sol by gravity in an upper region of said zone, passing the zeolite downwardly by gravity through an ascending stream of water, thereafter suspending the zeolite in an acid solution and passing the resultant suspension upwardly through a second zone wherein the hydrogen exchange zeolite is regenerated, separating the regenerated zeolite by gravity from the regenerating solution in an upper region of said second zone and passing the same downwardly by gravity through a washing liquid to remove the regenerating solution, and then returning the regenerated zeolite to the first-mentioned zone in suspension in an additional quantity of the solution of alkali metal silicate.

CHARLES L. THOMAS.

REFERENCES CITED

The following references are of record in the file of this patent:

UNITED STATES PATENTS

| Number | Name | Date |
|---|---|---|
| 1,745,421 | Higgins | Feb. 4, 1930 |
| 1,770,580 | Neumann | July 15, 1930 |
| 1,608,661 | Nordell | Nov. 30, 1926 |
| 1,752,339 | Green | Apr. 1, 1930 |
| 1,763,783 | Hodkinson | June 17, 1930 |
| 1,763,784 | Hodkinson | June 17, 1930 |
| 2,003,757 | Pick | June 4, 1935 |
| 1,114,095 | Baskerville | Oct. 20, 1914 |
| 1,297,635 | Ayres, Jr. | Mar. 18, 1919 |
| 2,321,459 | Chenault et al. | June 8, 1943 |
| 2,321,460 | Chenault et al. | June 8, 1943 |
| 2,321,458 | Chenault et al. | June 8, 1943 |
| 2,341,193 | Scheineman | Feb. 8, 1944 |
| 1,907,929 | Deacon et al. | Nov. 7, 1911 |
| 1,620,431 | Bramwell | Mar. 8, 1927 |
| 2,244,325 | Bird | June 3, 1941 |